US012633806B2

(12) United States Patent
Ichikawa et al.

(10) Patent No.: US 12,633,806 B2
(45) Date of Patent: May 19, 2026

(54) ELECTRIC ROTATING MACHINE APPARATUS AND ELECTRIC POWER STEERING APPARATUS

(71) Applicant: Mitsubishi Electric Corporation, Tokyo (JP)

(72) Inventors: Takanori Ichikawa, Tokyo (JP); Akira Kimishima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 239 days.

(21) Appl. No.: 18/697,667

(22) PCT Filed: Nov. 4, 2021

(86) PCT No.: PCT/JP2021/040570
§ 371 (c)(1),
(2) Date: Apr. 1, 2024

(87) PCT Pub. No.: WO2023/079618
PCT Pub. Date: May 11, 2023

(65) Prior Publication Data
US 2025/0233491 A1      Jul. 17, 2025

(51) Int. Cl.
*H02K 11/00* (2016.01)
*H02K 11/33* (2016.01)

(52) U.S. Cl.
CPC ......... *H02K 11/33* (2016.01); *H02K 11/0094* (2013.01); *H02K 2203/03* (2013.01); *H02K 2211/03* (2013.01)

(58) Field of Classification Search
CPC ............... H02K 11/33; H02K 11/0094; H02K 2203/03; H02K 2211/03; H02K 2213/06;
(Continued)

(56) References Cited

U.S. PATENT DOCUMENTS

| 2018/0026492 A1 | 1/2018 | Takizawa et al. |
| 2019/0068030 A1* | 2/2019 | Sato ........................ H02K 11/33 |

(Continued)

FOREIGN PATENT DOCUMENTS

| EP | 3447887 A1 | 2/2019 |
| JP | 2018-207639 A | 12/2018 |

(Continued)

OTHER PUBLICATIONS

Extended European Search Report dated Dec. 2, 2024 from the European Patent Office in Application No. 21963215.5.
(Continued)

*Primary Examiner* — Thomas Truong
(74) *Attorney, Agent, or Firm* — Sughrue Mion, PLLC

(57) ABSTRACT

It is required to obtain an electric rotating machine apparatus that secures a heat-radiation property, suppresses upsizing, and can suppress the effect of noise generated from a current-supply circuit. The electric rotating machine apparatus according to the present disclosure includes an electric rotating machine, a heat sink having a plate-shaped portion extending toward axial-direction one side, a current-supply circuit board that is disposed on one surface of the plate-shaped portion of the heat sink and on which a current-supply circuit for supplying an electric current to the electric rotating machine is mounted, and a control circuit board that is disposed in such a way as to be spaced apart from and in parallel with the current-supply circuit board and on which a control circuit for controlling the current-supply circuit is mounted. In addition, an electric power steering apparatus according to the present disclosure includes the foregoing electric rotating machine apparatus.

13 Claims, 14 Drawing Sheets

(58) Field of Classification Search
       CPC ........ H02K 5/225; H02K 9/227; H02K 11/30;
                                     B62D 5/0406
       See application file for complete search history.

(56) References Cited

U.S. PATENT DOCUMENTS

| | | |
|---|---|---|
| 2019/0276071 A1 * | 9/2019 | Nagashima ............. H02P 25/22 |
| 2023/0059509 A1 | 2/2023 | Mima et al. |
| 2024/0072614 A1 | 2/2024 | Kawano |

FOREIGN PATENT DOCUMENTS

| | | |
|---|---|---|
| JP | 2019-41507 A | 3/2019 |
| JP | 2020-141499 A | 9/2020 |
| JP | 6922435 B2 | 8/2021 |
| WO | 2016/166796 A1 | 10/2016 |
| WO | 2017/158966 A1 | 9/2017 |
| WO | 2021/100075 A1 | 5/2021 |
| WO | 2021/192380 A1 | 9/2021 |

OTHER PUBLICATIONS

International Search Report for PCT/JP2021/040570 dated Dec. 21, 2021.

* cited by examiner

ELECTRIC ROTATING MACHINE APPARATUS AND ELECTRIC POWER STEERING APPARATUS

This Application is a National Stage of International Application No. PCT/JP2021/040570 filed Nov. 4, 2021.

TECHNICAL FIELD

The present disclosure relates to an electric rotating machine apparatus and an electric power steering apparatus.

BACKGROUND ART

There has been produced an electric power steering apparatus having an electric rotating machine apparatus in which an electric rotating machine and a control unit are integrated with each other. With regard to such an electric rotating machine apparatus, a control-unit configuration has been proposed. Because a current-supply circuit that supplies a large current for driving an electric rotating machine generates heat, there has been disclosed a control-unit structure provided with a heat sink for cooling the current-supply circuit (for example, Patent Document 1).

CITATION LIST

Patent Literature

Patent Document 1: Japanese Patent Application Laid-Open No. 2019-41507

SUMMARY OF INVENTION

Technical Problem

In a technology disclosed in Patent Document 1, a control circuit board on which both a current-supply circuit (power circuit) for driving an electric rotating machine and a control circuit for controlling the operation of the current-supply circuit are mounted is disposed along the axial direction of the electric rotating machine. A heat sink is provided at one center-axis side of the electric rotating machine and the control circuit board is mounted on the heat sink, so that the heat thereof is radiated. Because the current-supply circuit for driving the electric rotating machine and the control circuit for controlling the current-supply circuit are mounted on one and the same circuit board, the product size, especially, the size in the radial direction of the electric rotating machine can be reduced.

However, because the current-supply circuit for driving the electric rotating machine and the control circuit for controlling the current-supply circuit are mounted on one and the same circuit board, a problem is posed by noise generated through switching of the current-supply circuit. Noise generated by the current-supply circuit affects the operation of a MICON or the like included in the control circuit and hence the performance of the product is deteriorated. Moreover, in the case where in consideration of the effect of noise, a certain distance between the current-supply circuit and the control circuit is secured in one and the same circuit board, the size of the circuit board is enlarged and hence the electric rotating machine apparatus is upsized.

Thus, the objective of the present disclosure is to obtain an electric rotating machine apparatus provided with an electric rotating machine that secures a heat-radiation property, suppresses the product size from being enlarged, and can suppress the effect of noise generated from a current-supply circuit. Moreover, the objective of the present disclosure is to obtain a small-size and lightweight electric power steering apparatus utilizing an electric rotating machine that secures a heat-radiation property, suppresses the product size being enlarged, and can suppress the effect of noise generated from a current-supply circuit.

Solution to Problem

An electric rotating machine apparatus according to the present disclosure includes
an electric rotating machine,
a heat sink that is disposed at axial-direction one side of the electric rotating machine and has a plate-shaped portion extending toward the axial-direction one side,
a current-supply circuit board that is disposed on one surface of a plate-shaped portion of the heat sink and on which a current-supply circuit for supplying an electric current to the electric rotating machine is mounted, and
a control circuit board that is disposed in such a way as to be spaced apart from and in parallel with the current-supply circuit board and on which a control circuit for controlling the current-supply circuit is mounted.
In addition, an electric power steering apparatus according to the present disclosure includes the foregoing electric rotating machine apparatus.

Advantageous Effects of Invention

In an electric rotating machine apparatus and an electric power steering apparatus according to the present disclosure, it is made possible to obtain an electric rotating machine that secures a heat-radiation property, suppresses the product size from being enlarged, and can suppress the effect of noise generated from a current-supply circuit.

Moreover, the objective of the present disclosure is to obtain a small-size and lightweight electric power steering apparatus utilizing an electric rotating machine that secures a heat-radiation property, suppresses the product size from being enlarged, and can suppress the effect of noise generated from a current-supply circuit.

BRIEF DESCRIPTION OF DRAWINGS

FIG. 1 is a circuit diagram of an electric rotating machine apparatus according to Embodiment 1;

FIG. 2 is an axial-direction cross-sectional view of the rotating electric machine apparatus according to Embodiment 1;

FIG. 9 is a circumferential-direction cross-sectional view of a control unit of the electric rotating machine apparatus according to Embodiment 4;

DESCRIPTION OF EMBODIMENTS

1. Embodiment 1

Figure 1:
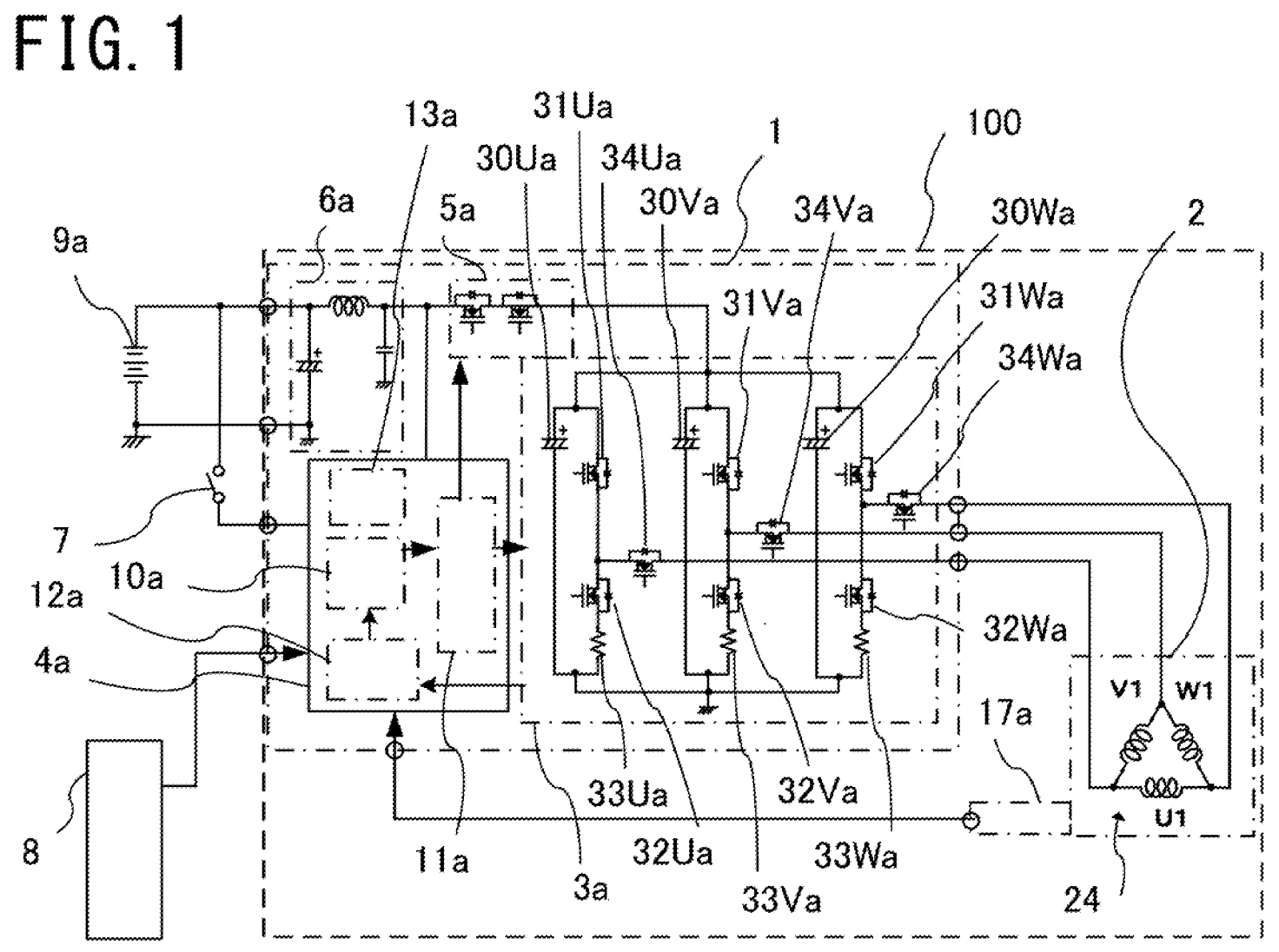
Figure 3:
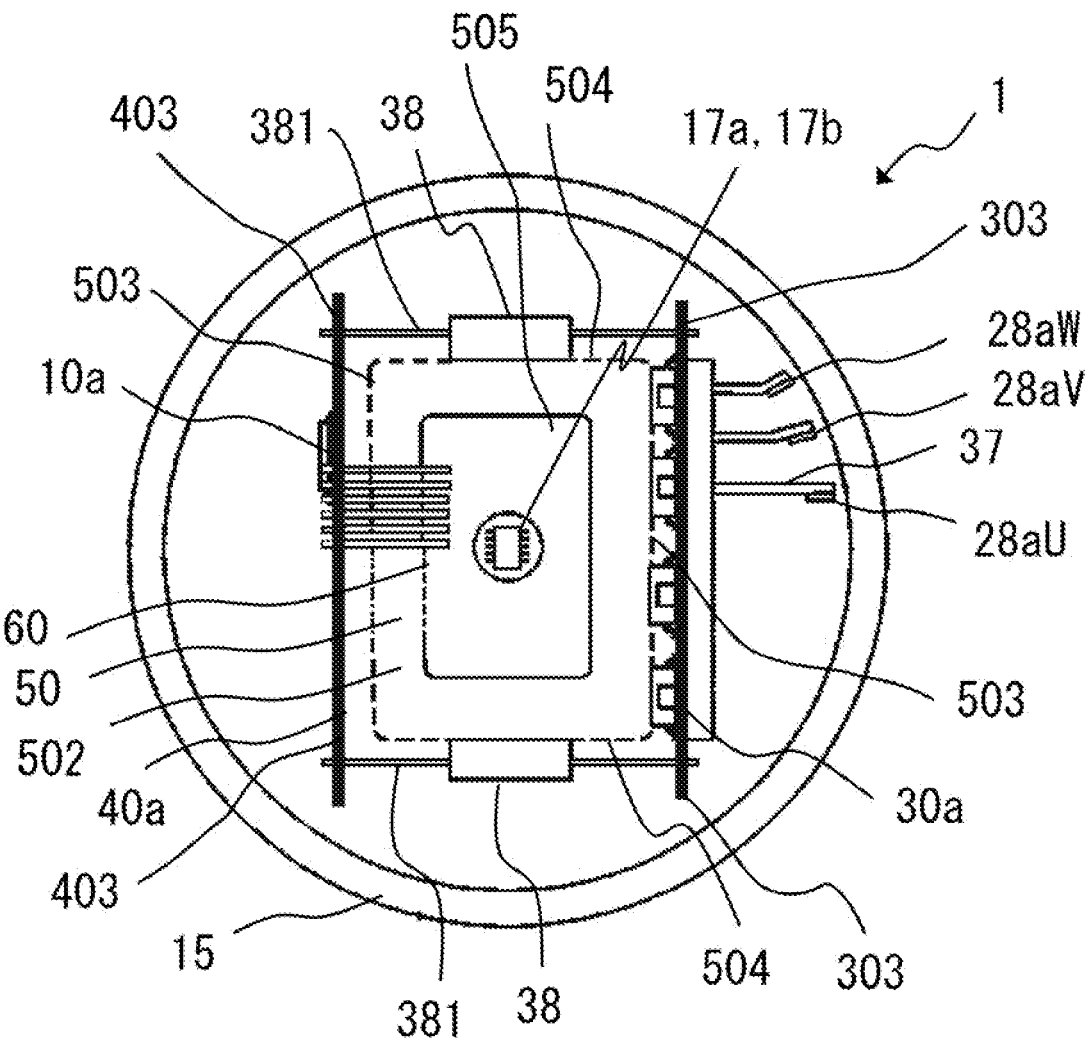
FIG. 3 is a circumferential-direction cross-sectional view of a control unit of the electric rotating machine apparatus according to Embodiment 1.

Hereinafter, an electric rotating machine apparatus 100 according to Embodiment 1 of the present disclosure will be explained with reference to the drawings. FIG. 1 is a circuit diagram of the electric rotating machine apparatus 100 according to Embodiment 1. The circuit diagram in FIG. 1 represents an example in which the electric rotating machine apparatus 100 is applied to an electric power steering apparatus.

Control Unit

Although in FIG. 1, an electric rotating machine 2 will be explained as a three-phase electric rotating machine, it may be allowed that the electric rotating machine 2 is a multi-phase-winding electric rotating machine for three or more phases. A control unit 1 has a control circuit 4a equipped with a CPU 10a, a current-supply circuit 3a for supplying a current to the electric rotating machine 2, a power-source relay 5a, and a filter 6a. The portion obtained by removing the electric rotating machine 2 from the electric rotating machine apparatus 100 is the control unit. The control unit 1 is connected with a power-source input and a grounding input from a battery 9a mounted in a vehicle.

The filter 6a includes a coil and a capacitor for suppressing noise in the power-source system (+B, ground). Moreover, the power-source relay 5a that opens/closes the +B power-source line is inserted in the +B power-source line. The power-source relay 5a has two switching devices and two respective parasitic diodes in the forward and reverse directions along the current-supply direction. The power-source relay 5a can forcibly cut off the electric-power supply, in the case where, for example, a failure occurs in the current-supply circuit 3a or the electric rotating machine 2. Moreover, in the case where the battery 9a is reversely connected, the power-source relay 5a can cut off a line through which a current flows; thus, the power-source relay 5a also plays a role of so-called battery-reverse-connection protection.

Control Circuit

Closing information on an ignition switch 7 is inputted to the control circuit 4a. Moreover, from a sensor group 8, information items from a torque sensor, which is mounted in the vicinity of the handwheel and detects steering torque, a speed sensor, which detects the traveling speed of the vehicle, and the like are inputted to the control circuit 4a.

The battery 9a supplies electric power to the control circuit 4a by way of the filter 6a; a power-source output is generated by a power-source circuit 13a and is supplied to the inside of the control circuit 4a. The information items from the sensor group 8 are transmitted to the CPU 10a by way of an input circuit 12a of the control circuit 4a. Based on those information items, the CPU 10a calculates and outputs the value of a current for rotating the electric rotating machine 2. The output signal of the CPU 10a is transmitted to the current-supply circuit 3a by way of a driving circuit 11a included in an output circuit. When receiving a command signal from the CPU 10a, the driving circuit 11a outputs driving signals for driving respective switching devices in the current-supply circuit 3a.

Parts of the control circuit 4a are mounted on a control circuit board. The driving circuit 11a is disposed in the control circuit 4a, because only a small current flows therein; however, the driving circuit 11a can be disposed also in the current-supply circuit 3a.

Current-Supply Circuit

The current-supply circuit 3a has U1-phase upper-arm and lower-arm switching devices 31Ua and 32Ua for a U1 phase of a three-phase winding 24 of the electric rotating machine 2, V1-phase upper-arm and lower-arm switching devices 31Va and 32Va for a V1 phase of the three-phase winding 24 of the electric rotating machine 2, and W1-phase upper-arm and lower-arm switching devices 31Wa and 32Wa for a W1 phase of the three-phase winding 24 of the electric rotating machine 2. Moreover, the current-supply circuit 3a has electric-rotating-machine relay switching devices 34Ua, 34Va, and 34Wa for connecting or disconnecting wiring with the winding 24a of the electric rotating machine 2. Furthermore, the current-supply circuit 3a includes current-detection shunt resistors 33Ua, 33Va, and 33Wa and capacitors 30Ua, 30Va, and 30Wa.

Based on commands from the CPU 10a, the upper-arm and lower-arm switching devices 31Ua and 32Ua are PWM-driven. Accordingly, in order to suppress noise, the capacitor 30Ua is connected in parallel with the upper-arm and lower-arm switching devices 31Ua and 32Ua. This method is applied also to the V phase and the W phase. Because having the same circuit configuration for each of the windings 24 of the respective phases, the current-supply circuit 3a can supply currents independently to the windings 24 of the respective phases.

Although in FIG. 1, the description is omitted, the respective electric-potential differences across the shunt resistors 33Ua, 33Va, and 33Wa and, for example, the respective voltages of the terminals of the windings 24 are also transmitted to the first input circuit 12a. These information items are also inputted to the CPU 10a; the CPU 10a calculates the difference between the calculated current value and a detection value and then performs so-called feedback control so as to supply a desired motor current and to assist steering power.

Furthermore, the control circuit 4a outputs a driving signal for the power-source relay 5a. From the power-source relay 5a, a power source is supplied to the current-supply circuit 3a by way of the filter 6a; the power-source relay 5a can cut off current supply to the electric rotating machine 2.

The electric-rotating-machine relay switching devices 34Ua, 34Va, and 34Wa are also provided in the current-supply circuit 3a and can cut off the respective phases. In order to suppress emission of noise caused by PWM driving in the current-supply circuit 3a, the filter 6a including a capacitor and a coil is disposed close to the power-source input. Because a large current flows in the driving circuit for the power-source relay 5a and hence heat is generated, it may be allowed that the power-source relay 5a is contained in the current-supply circuit 3a so as to be configured as part of the current-supply circuit 3a.

Electric Rotating Machine Apparatus

Figure 2:
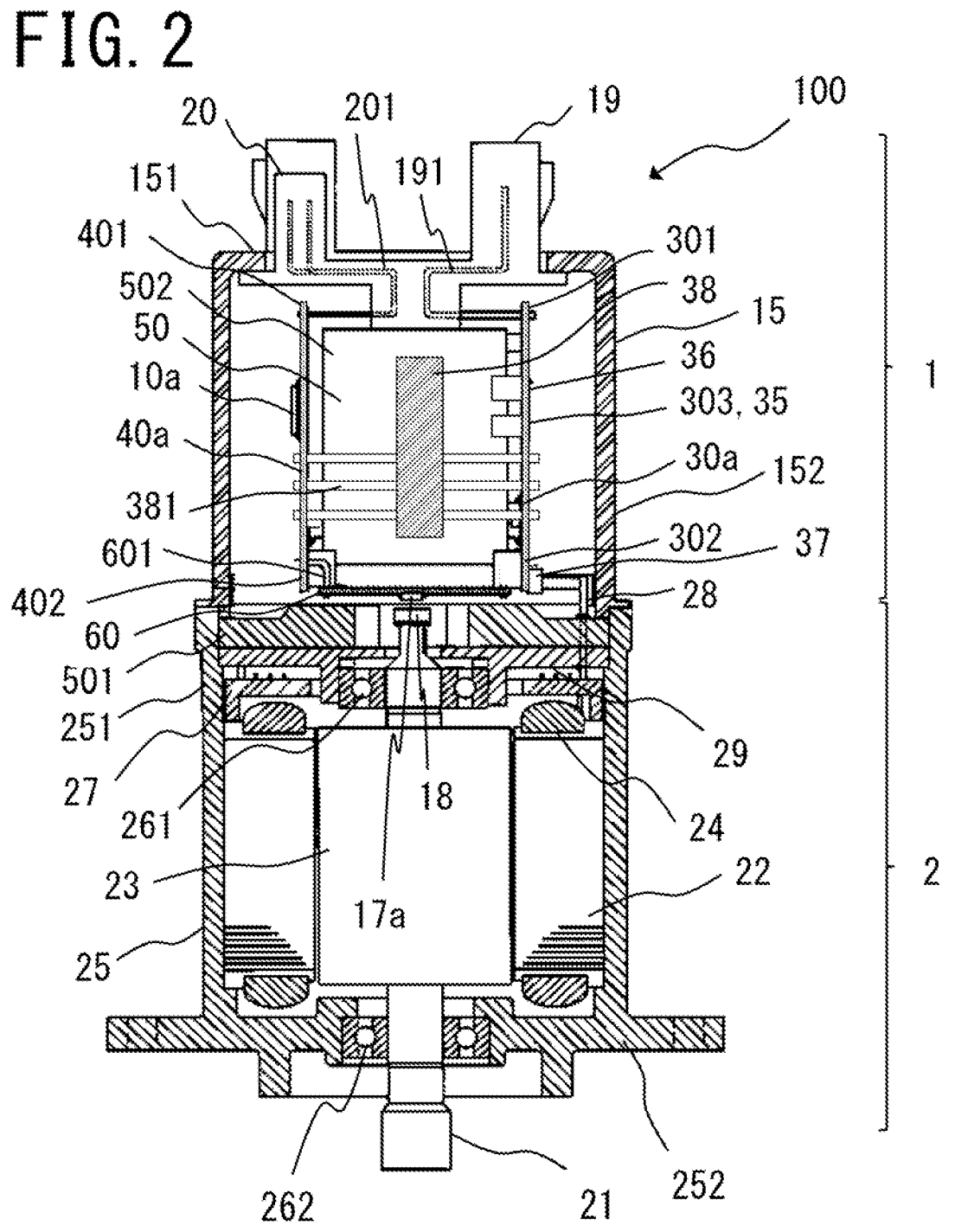

FIG. 2 is an axial-direction cross-sectional view of the electric rotating machine apparatus 100 according to Embodiment 1. The electric rotating machine apparatus 100 is provided with the control unit 1 and the electric rotating machine 2. The control unit 1 is disposed at one axial-direction side of the output axle 21 of the electric rotating machine 2 in such a way as to be adjacent to the electric rotating machine 2. The control unit 1 and the electric rotating machine 2 are integrated with each other.

In many cases, in an electric power steering apparatus, the electric rotating machine 2 is disposed in such a way that the axial direction of the output axle 21 thereof is oriented to the vertical direction and the control unit 1 is disposed upper than the electric rotating machine 2. The output of the electric rotating machine 2 is outputted from the bottom end portion of the output axle 21 to, for example, a speed reducer (unillustrated). The foregoing output drives a steering gear or a steering rack, so that steering power is generated.

The electric rotating machine 2 has an electric-rotating-machine case 25, a stator 22 disposed inside the electric-rotating-machine case 25, a rotor 23, and the like. The electric-rotating-machine case 25 includes a cylinder portion 251 and a bottom portion 252 that seals the opening at the output side of the cylinder portion 251. The electric-rotating-machine case 25 is formed in the shape of a bottomed cylindrical tube. The electric-rotating-machine case 25 is made of metal; when the heat-radiation property and the outer shape thereof are considered, it is desirable that the electric-rotating-machine case 25 is made of aluminum.

The frame 29 is formed in the shape of a disk made of a metal material. The frame 29 is inserted into and fixed to the anti-output-side opening of the cylinder portion 251, through a process such as press-fitting or shrink-fitting. The frame 29 seals the anti-output-side opening of the cylinder portion 251. The electric rotating machine 2 is separated from the control unit 1 by the frame 29.

The stator 22 is inserted into and held by the cylinder portion 251 of the electric-rotating-machine case 25, through press-fitting or shrink-fitting. The stator 22 has three-phase winding 24. A ring-shaped wiring portion 27 is disposed at the output side of the frame 29 and close to the winding 24. The respective terminals of the three-phase winding 24 are connected with the wiring portion 27. A phase terminal 28 through which a three-phase current for driving the electric rotating machine 2 flows extends from the wiring portion 27, penetrates the frame 29, and then drawn out to the anti-output side.

The output axle 21 penetrating the rotor 23 is supported by a bearing 261 disposed at the center-axis position of the frame 29 and a bearing 262 disposed at the center-axis position of the bottom portion 252. The rotor 23 is pivotably disposed inside the electric-rotating-machine case 25. The rotor 23 is pivotably disposed inside the stator 22 in such a way as to be coaxial with the stator 22. The sensor rotor 18 is disposed at the end, of the output axle 21, that protrudes from the frame 29. In addition, although not illustrated, two or more permanent magnets are disposed on the outer circumferential surface of the rotor 23 at a constant pitch, in such a way that the respective N-poles and the respective S-poles thereof are alternately arranged.

Arrangement of Control Unit

FIG. 3 is a circumferential-direction cross-sectional view of the control unit 1 of the electric rotating machine apparatus 100 according to Embodiment 1. FIG. 3 is a drawing of the control unit 1 viewed from a sensor circuit board 60 after the control unit 1 is separated from the electric rotating machine 2 and a base portion 501 of a heat sink 50 is removed. The arrangement of the control unit 1 will be explained based on FIGS. 2 and 3. It is required that the area of the control unit 1 in its radial direction, which is the direction perpendicular to the output axle 21, is the same as or smaller than the radial-direction area of the electric rotating machine 2. Accordingly, there is adopted a vertical arrangement in which the main portions of the control unit 1 are arranged in such a way as to be coaxial with the output axle 21

The outer circumference of the control unit 1 is covered with a resin-made housing 15. The housing 15 is formed of a connector portion 151 and a cylindrical tubular circumferential wall 152. The connector portion 151 of the housing 15 holds a power-source connector 19 that connects the control unit 1 with the battery 9a, which is an external power source, and a signal connector 20 that connects the control unit 1 with the sensor group 8. The circumferential wall 152 of the housing 15 is cylindrical tubular and covers the constituent components of the control unit 1 so as to protect them.

The housing 15 whose opening is oriented downward is fitted to the opening of the cylinder portion 251 of the electric-rotating-machine case 25 so as to be mounted to the cylinder portion 251 by use of a screw (unillustrated) or the like. The power-source connector 19 and two or more signal connectors 20 to be connected with the sensor group 8 are arranged on the anti-output-side endface of the connector portion 151 of the housing 15.

The power-source connector 19 and the signal connector 20 are formed integrally with the connector portion 151 of the housing 15. The power-source connector 19, the signal connector 20, wiring leads of the filter 6a, a signal terminal 201 of the signal connector 20, a power-source terminal 191 of the power-source connector 19, and the like are insertion-molded in the connector portion 151.

The heat sink 50, a current-supply circuit board 30a, and a control circuit board 40a are arranged in the housing 15. The heat sink 50 is disposed at the axial-direction anti-output side of the electric rotating machine 2 and has a plate-shaped portion 502 that extends toward the axial-direction anti-output side. The current-supply circuit board 30a is disposed on the surface of one of long-side arrangement portions 503 in the plate-shaped portion 502 of the heat sink 50. The control circuit board 40a is arranged spaced apart from the current-supply circuit board 30a and in parallel therewith. In the case of FIG. 3, the control circuit board 40a is disposed on the surface of the other one of the long-side arrangement portions 503 in the plate-shaped portion 502 of the heat sink 50. The heat sink 50 is made of a high-heat-conductivity material such as aluminum or copper. The heat sink 50 has the disk-shaped base portion 501 and the rectangular-parallelepiped plate-shaped portion 502 that stands erect at the central portion of the base portion 501.

The base portion 501 of the heat sink 50 is disposed in the anti-output-side opening of the cylinder portion 251 of the electric-rotating-machine case 25. The base portion 501 is pressure-sandwiched between the frame 29 and the circumferential wall 152 of the housing 15 mounted to the cylinder portion 251. Accordingly, the heat sink 50 is fixed to the electric rotating machine 2.

The base portion 501 of the heat sink 50 makes contact with the inner-circumference wall face of the cylinder portion 251 and with the anti-output-side endface of the frame 29. The plate-shaped portion 502 of the heat sink 50 is situated on the axial-direction extended line of the output axle 21 and is disposed inside the housing 15. As illustrated in FIG. 3, the plate-shaped portion 502 has a rectangular cross section with the long-side arrangement portions 503 and short-side arrangement portions 504.

Arrangement of Current-Supply Circuit Board

As illustrated in FIGS. 2 and 3, the current-supply circuit board 30a is in the shape of a rectangular plate and has an upper side 301, a lower side 302, and longitudinal sides 303. Connection holes for interchanging power sources and signals are provided in each of the foregoing sides. Two or more switching devices 31Ua, 32Ua, 31Va, 32Va, 31Wa, and 32Wa (described only in FIG. 1), a smoothing capacitor 35, a filter coil 36, and the like are mounted on the current-supply circuit board 30a. Then, the current-detection shunt resistors 33Ua, 33Va, and 33Wa (described only in FIG. 1) are surface-mounted on the current-supply circuit board 30a through soldering or the like. In addition, the filter coil 36 and the smoothing capacitor 35 are also surface-mounted thereon.

The current-supply circuit board 30a is disposed at the long-side arrangement portions 503 in the plate-shaped portion 502 of the heat sink 50, in such a way that the plane of the current-supply circuit board 30a and the output axle 21 are substantially parallel to each other. The signal terminal 201 and the power-source terminal 191 that are drawn out from the connector portion 151 of the housing 15 are connected with the connection holes provided in the upper side 301 of the current-supply circuit board 30a.

A current-supply terminal 37 is connected with the connection hole in the lower side 302 of the current-supply circuit board 30a. The phase terminal 28 connected with the winding 24 of the electric rotating machine 2 is connected with the current-supply terminal 37 that is relay-feasible. The current-supply terminal 37 includes a terminal portion formed of sheet metal such as copper or the like and a resin portion for holding the terminal portion.

As illustrated in FIG. 3, the respective current-supply terminals 37 extend from the current-supply circuit board 30a toward the radial-direction outer side of the electric rotating machine 2 and are connected with phase terminals 28aU, 28aV, and 28aW of the electric rotating machine 2. Each of the phase terminals 28aU, 28aV, and 28aW and the corresponding current-supply terminal 37 are connected with each other through soldering or the like.

Arrangement of Control Circuit Board

The CPU 10a, the driving circuit 11a, the input circuit 12a, the power-source circuit 13a, and the like are mounted on the control circuit board 40a (11a, 12a, and 13a are described only in FIG. 1). As illustrated in FIGS. 2 and 3, the control circuit board 40a is in the shape of a rectangular plate and has an upper side 401, a lower side 402, and longitudinal sides 403. Connection holes for interchanging power sources and signals are provided in each of the foregoing sides. Moreover, the CPU 10a and the like for calculating a control amount for electric-power supply to the electric rotating machine 2 are surface-mounted.

The control circuit board 40a is disposed at the long-side arrangement portions 503 in the plate-shaped portion 502 of the heat sink 50, in such a way that the plane of the control circuit board 40a and the output axle 21 are substantially parallel to each other. The control circuit board 40a is disposed at a side opposite to the side, of the plate-shaped portion 502, where the current-supply circuit board 30a is disposed. The arrangement is made in such a way that the plate-shaped portion 502 of the heat sink 50 is interposed between the current-supply circuit board 30a and the control circuit board 40a.

Arrangement in the foregoing manner makes it possible that the temperature of the current-supply circuit board 30a that generates heat when supplying an electric current to the electric rotating machine 2 is lowered by heat transfer through the heat sink 50. Furthermore, because the control circuit board 40a and the current-supply circuit board 30a are arranged in such a way that the plate-shaped portion 502 of the heat sink 50 is inserted therebetween, propagation of noise can be suppressed.

Noise generated in the current-supply circuit 3a, caused by implementation of switching control, can be suppressed from propagating to the control circuit 4a. When the current-supply circuit board 30a and the control circuit 4a are arranged on one and the same circuit board, noise caused by turning on/off of the switching device propagates through common power-source strip conductors and common grounding strip conductors. However, propagation of the noise can be prevented by separating the control circuit board 40a from the current-supply circuit board 30a.

In addition, because the control circuit board 40a and the current-supply circuit board 30a are arranged in such a way as to be spaced apart from and in parallel with each other, the space in the housing 15 can effectively be utilized and hence the arrangement can contribute to downsizing of the outer diameter of the control unit 1. Moreover, because the control circuit board 40a and the current-supply circuit board 30a are arranged in such a way as to be spaced apart from each other, a space exists therebetween and hence the effect of noise emission by the current-supply circuit board 30a can be reduced.

In particular, in the arrangement, according to Embodiment 1, of the heat sink 50, the current-supply circuit board 30a, and the control circuit board 40a illustrated in FIG. 3, because the plate-shaped portion 502, of the heat sink 50, that is a heat-conductive material, is interposed between the current-supply circuit board 30a and the control circuit board 40a, radiation noise from the current-supply circuit board 30a can conspicuously be suppressed from propagating to the control circuit board 40a.

Joint Part

The signal terminal 381 disposed at the short-side arrangement portion 504 of the plate-shaped portion 502 of the heat sink 50 is connected with the connection hole in the longitudinal side 303 of the current-supply circuit board 30a. The signal terminal 381 connects the current-supply circuit board 30a with the control circuit board 40a; the signal terminal 381 extends perpendicularly to the axial direction of the electric rotating machine 2 so as to connect the foregoing circuit boards. Then, as illustrated in FIG. 2, two or more signal terminals 381 line up in the axial direction of the electric rotating machine 2 so as to form a joint part 38.

Because the foregoing configuration makes it possible to connect the current-supply circuit board 30*a* with the control circuit board 40*a* at an appropriate position and to optimize the wiring strip conductors of the current-supply circuit board 30*a* and the control circuit board 40*a*, it is made possible to raise the wiring efficiency of the current-supply circuit board 30*a* and the control circuit board 40*a*; thus, foregoing configuration can contribute to downsizing and weight saving of the current-supply circuit board 30*a* and the control circuit board 40*a*.

As is the case with the current-supply terminal 37, the signal terminal 381 includes a terminal portion formed of sheet metal such as copper or the like and a resin portion for holding the terminal portion. The respective terminals to be connected with the connection holes of the current-supply circuit board 30*a* and the control circuit board 40*a* are connected through soldering so as to form an electric circuit and then signals required for driving-controlling the electric-rotating-machine driving circuit are interchanged.

Sensor Circuit Board

As illustrated in FIG. 2, the signal terminal 201 and the power-source terminal 191 that are drawn out from the connector portion 151 of the housing 15 are connected with the connection holes in the upper side 401 of the control circuit board 40*a*. A signal terminal 601 drawn out from the sensor circuit board 60 on which an after-mentioned rotation sensor 17*a* is mounted is connected with the connection hole in the lower side 402 of the control circuit board 40*a*.

A concave portion 505 for disposing the sensor circuit board 60 on which the rotation sensor 17*a* is mounted is formed in part of the base portion 501 of the heat sink 50. The rotation sensor 17*a* mounted on the sensor circuit board 60 is disposed in the concave portion 505 in such a way as to face the sensor rotor 18 attached to the anti-output-side end portion of the output axle 21.

Providing the sensor circuit board 60 separately from the current-supply circuit board 30*a* has an advantage, because noise in the current-supply circuit board 30*a* can be prevented from being superimposed on a signal from the rotation sensor 17*a*. Because it is only necessary that the signal from the rotation sensor 17*a* is inputted to the control circuit board 40*a*, the sensor circuit board 60 can be separated from the current-supply circuit 3*a* of the current-supply circuit board 30*a*.

The signal terminal 601 drawn out from the sensor circuit board 60 is connected with the connection hole in the lower side 302 of the current-supply circuit board 30*a*. The signal terminal 601 drawn out from the sensor circuit board 60 is connected with the connection hole in the lower side 402 of the control circuit board 40*a*. The current-supply circuit board 30*a* and the control circuit board 40*a* can be connected with each other through the intermediary of the sensor circuit board 60. As a result, because the current-supply circuit board 30*a* and the control circuit board 40*a* can be connected with each other, without utilizing the signal terminal 381 and joint part 38, it is made possible to promote downsizing, weight saving, and cost saving of the electric rotating machine apparatus.

2. Embodiment 2

Figure 4:
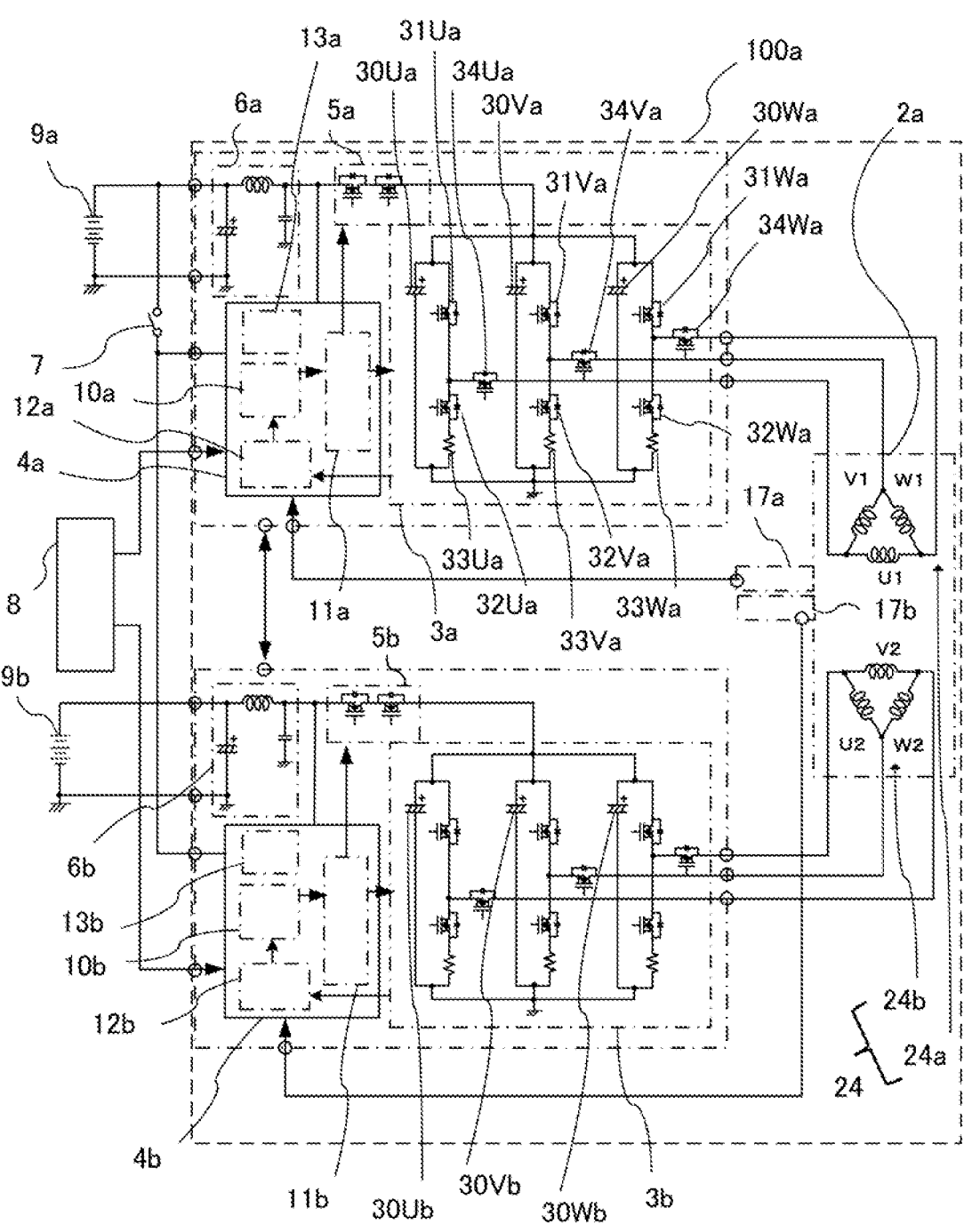
FIG. 4 is a circuit diagram of an electric rotating machine apparatus according to Embodiment 2.

FIG. 4 is a circuit diagram of an electric rotating machine apparatus 100*a* according to Embodiment 2. The electric rotating machine apparatus 100*a* according to Embodiment 2 is different from Embodiment 1 in that each of the circuits of the control unit and the winding 24 of the electric rotating machine are duplicated so that the redundancy is raised.

Specifically, the control unit 1*a* has the current-supply circuit 3*a*, a second current-supply circuit 3*b*, the control circuit 4*a*, and a second control circuit 4*b*. The control circuit 4*a* and the second control circuit 4*b* are connected with each other through a communication line and can each continue the operation, while verifying the mutual healthiness. The electric rotating machine 2*a* has a pair of windings 24*a* and 24*b*; even when one of the windings is broken or short-circuited, degenerated operation thereof can be implemented by use of the other one of the windings.

In contrast to FIG. 1 according to Embodiment 1, there exist a CPU 10*b*, a driving circuit 11*b*, an input circuit 12*b*, and a power-source circuit 13*b* that are constituent elements of the second control circuit 4*b*, the second current-supply circuit 3*b*, the second control circuit 4*b*, and the like, which are all added in FIG. 4. In addition to that, the second rotation sensor 17*b* and the like also exist. Each of the components has "b" in its reference character so as to be distinguished from the one in Embodiment 1. Because the function of each of the components is the same as the content of the corresponding constituent element having "a" in its reference character, explained in the circuit diagram in FIG. 1 according to Embodiment 1, the specific explanation therefor will be omitted.

Figure 5:
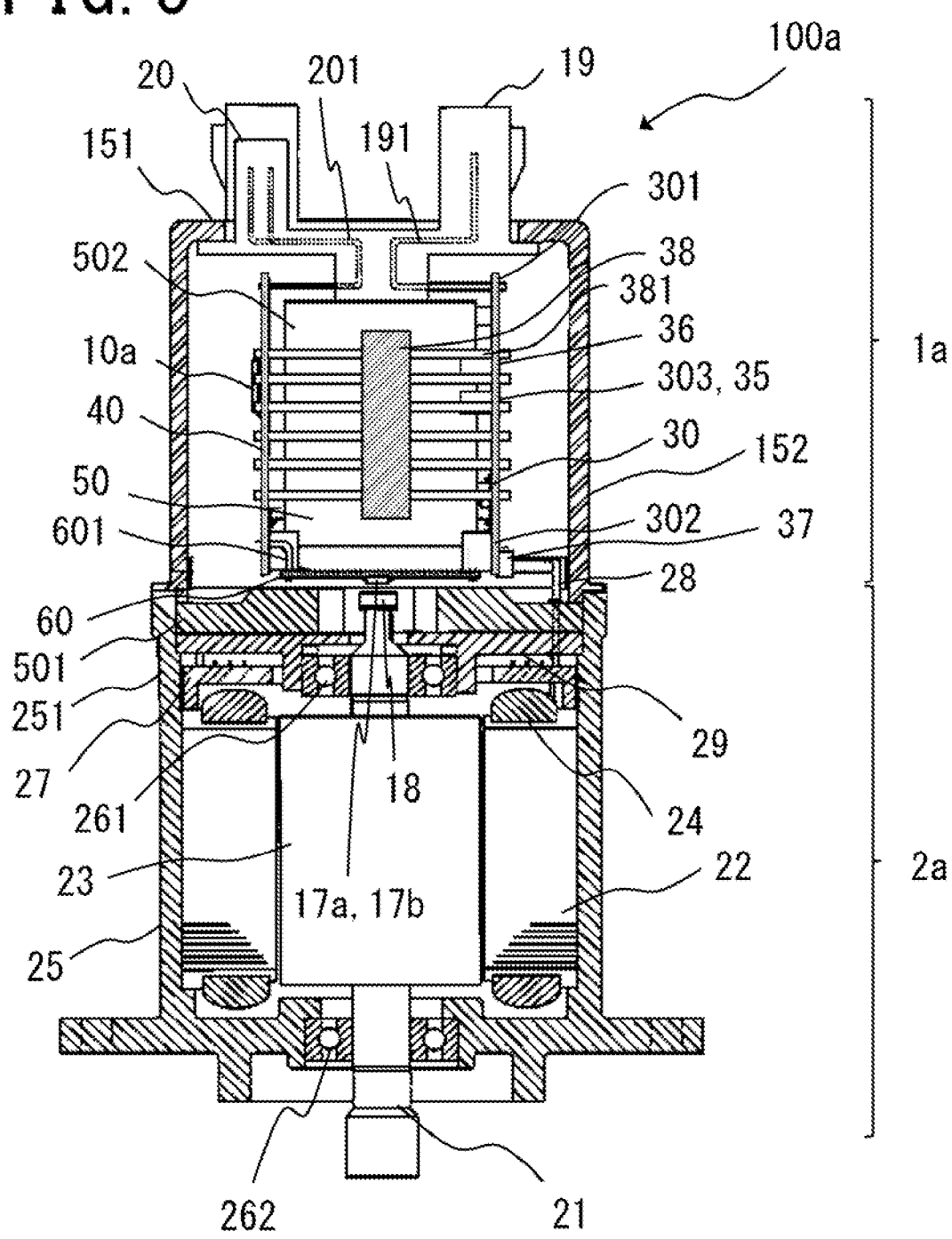
FIG. 5 is an axial-direction cross-sectional view of the rotating electric machine apparatus according to Embodiment 2.
Figure 6:
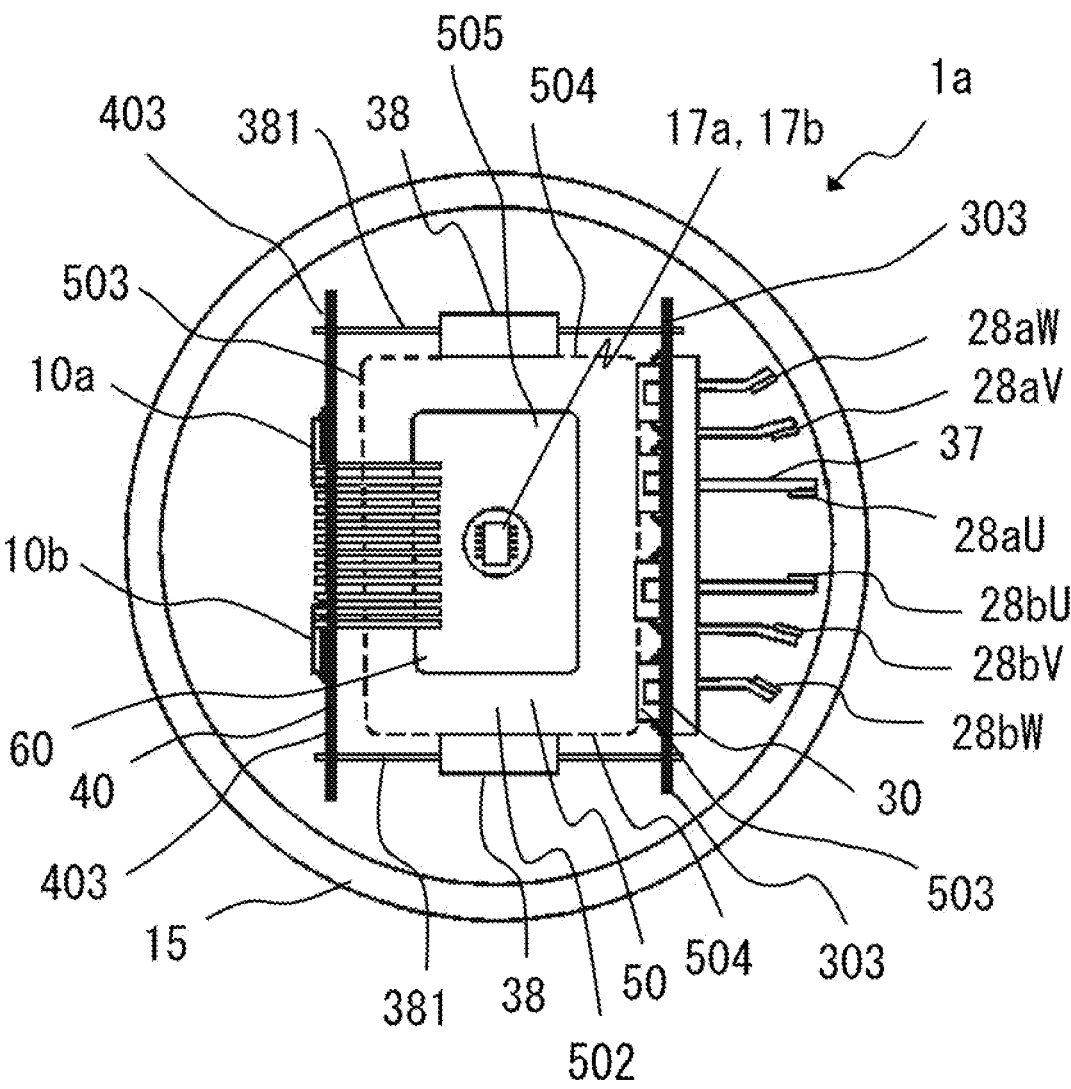
FIG. 6 is a circumferential-direction cross-sectional view of a control unit of the electric rotating machine apparatus according to Embodiment 2.

FIG. 5 is an axial-direction cross-sectional view of the electric rotating machine apparatus 100*a* according to Embodiment 2. FIG. 6 is a circumferential-direction cross-sectional view of the control unit 1*a* of the electric rotating machine apparatus 100*a* according to Embodiment 2. FIG. 6 is a drawing of the control unit 1*a* viewed from the sensor circuit board 60 after the control unit 1*a* is separated from the electric rotating machine 2*a* and the base portion 501 of the heat sink 50 is removed. The arrangement of the current-supply circuit board 30*a* and the control circuit board 40*a*, related to the duplicated control unit 1*a* and the electric rotating machine 2*a*, will be explained with reference to FIGS. 5 and 6.

The two circuits each having one and the same configuration, i.e., the current-supply circuit 3*a* and the second current-supply circuit 3*b* represented in FIG. 4 are mounted on the current-supply circuit board 30 illustrated in each of FIGS. 5 and 6. The two circuits each having one and the same configuration, i.e., the control circuit 4*a* and the second control circuit 4*b* represented in FIG. 4 are mounted on the control circuit board 40 illustrated in each of FIGS. 5 and 6.

The current-supply circuit board 30 is disposed at one of the long-side arrangement portions 503 in the plate-shaped portion 502 of the heat sink 50, in such a way that the plane of the current-supply circuit board 30 and the output axle 21 are substantially parallel to each other. The control circuit board 40 is disposed at the other one of the long-side arrangement portions 503 in the plate-shaped portion 502 of the heat sink 50, in such a way that the plane of the control circuit board 40 and the output axle 21 are substantially parallel to each other. The control circuit board 40 is disposed at a side opposite to the side, of the plate-shaped portion 502, where the current-supply circuit board 30 is disposed. The plate-shaped portion 502 of the heat sink 50 is interposed between the current-supply circuit board 30 and the control circuit board 40.

Arrangement in the foregoing manner makes it possible that the temperature of the current-supply circuit board 30 that generates heat when supplying an electric current to the electric rotating machine 2a is lowered by heat transfer through the heat sink 50. Furthermore, because the control circuit board 40 is disposed in such a way that the plate-shaped portion 502 of the heat sink 50 is inserted therebetween, propagation of noise can be suppressed. As described above, because even when two circuits of the same kind are mounted on one and the same circuit board, an effect the same as that of Embodiment 1 can be obtained by arranging the control circuit board 40 and the current-supply circuit board 30 in such a way that the plate-shaped portion 502 of the heat sink 50 is inserted therebetween.

3. Embodiment 3

Figure 7:
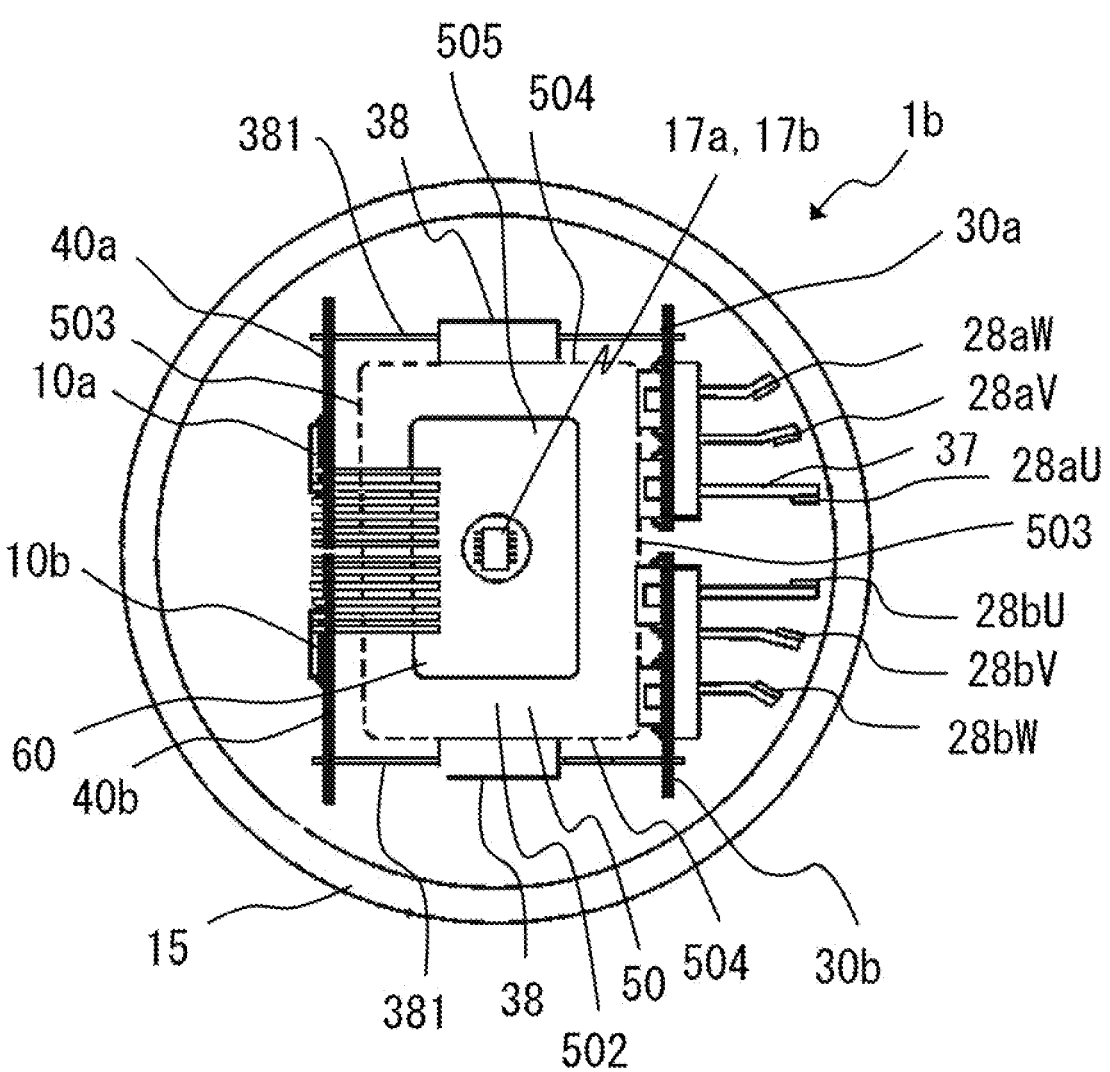
FIG. 7 is a circumferential-direction cross-sectional view of a control unit of an electric rotating machine apparatus according to Embodiment 3.

FIG. 7 is a circumferential-direction cross-sectional view of a control unit 1b of an electric rotating machine apparatus 100b according to Embodiment 3 (the electric rotating machine apparatus 100b is unillustrated). FIG. 7 is a drawing of the control unit 1b viewed from the sensor circuit board 60 after the control unit 1b is separated from the electric rotating machine 2a and the base portion 501 of the heat sink 50 is removed. The electric rotating machine apparatus 100b according to Embodiment 3 is different from Embodiment 2 in that duplicated circuits of the control unit 1b are mounted on respective separated circuit boards. The electric rotating machine 2a remains as it is; the circuit diagram in FIG. 2 can be utilized.

The current-supply circuit 3a is mounted on the current-supply circuit board 30a. The second current-supply circuit 3b is mounted on a second current-supply circuit board 30b. The control circuit 4a is mounted on the control circuit board 40a. The second control circuit board 4b is mounted on a second control circuit board 40b.

The current-supply circuit board 30a and the second current-supply circuit board 30b in a pair are arranged in a row. The control circuit board 40a and the second control circuit board 40b in a pair are arranged in a row. The arrangement in the foregoing manner makes it possible that as is the case with Embodiment 2, an effect the same as that of Embodiment 1 can be obtained while receiving benefit of the duplication. Moreover, because the duplicated circuits are mounted on the respective separate circuit boards, the effect of noise propagation between the circuits can be eliminated. Furthermore, because even when wire breaking or short-circuiting occurs in any one of the circuit boards, the other one thereof may escape from the effect; thus, the failure resistance can be raised.

As a method of lining up a pair of circuit boards of the same kind, not only lining up them on a plane but also lining up them vertically can be performed. Because stacking up them makes the occupation area small, it can contribute to the downsizing, weight saving, and cost reduction of the electric rotating machine apparatus 100b.

4. Embodiment 4

Figure 8:
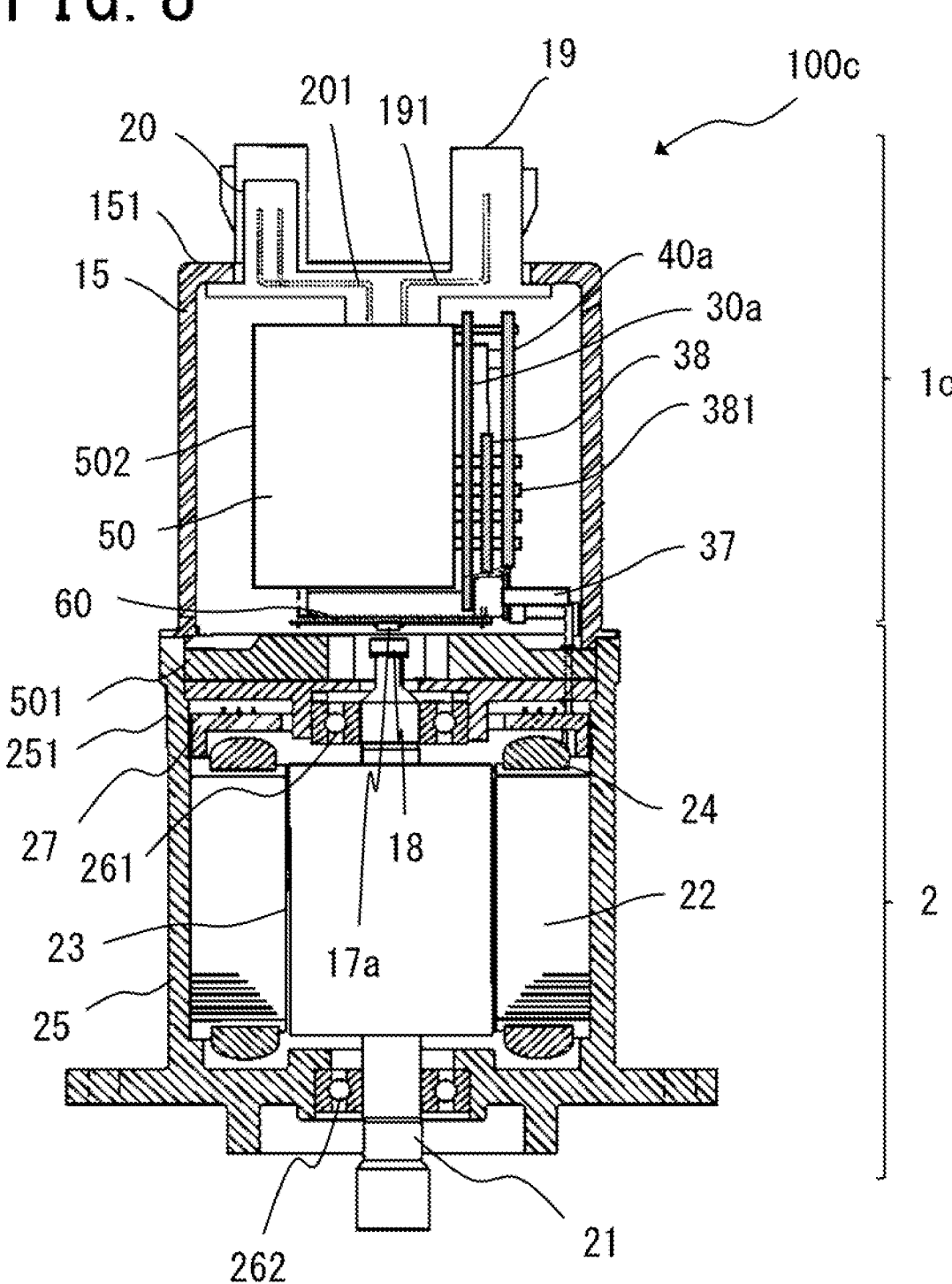
FIG. 8 is an axial-direction cross-sectional view of a rotating electric machine apparatus according to Embodiment 4.
Figure 9:
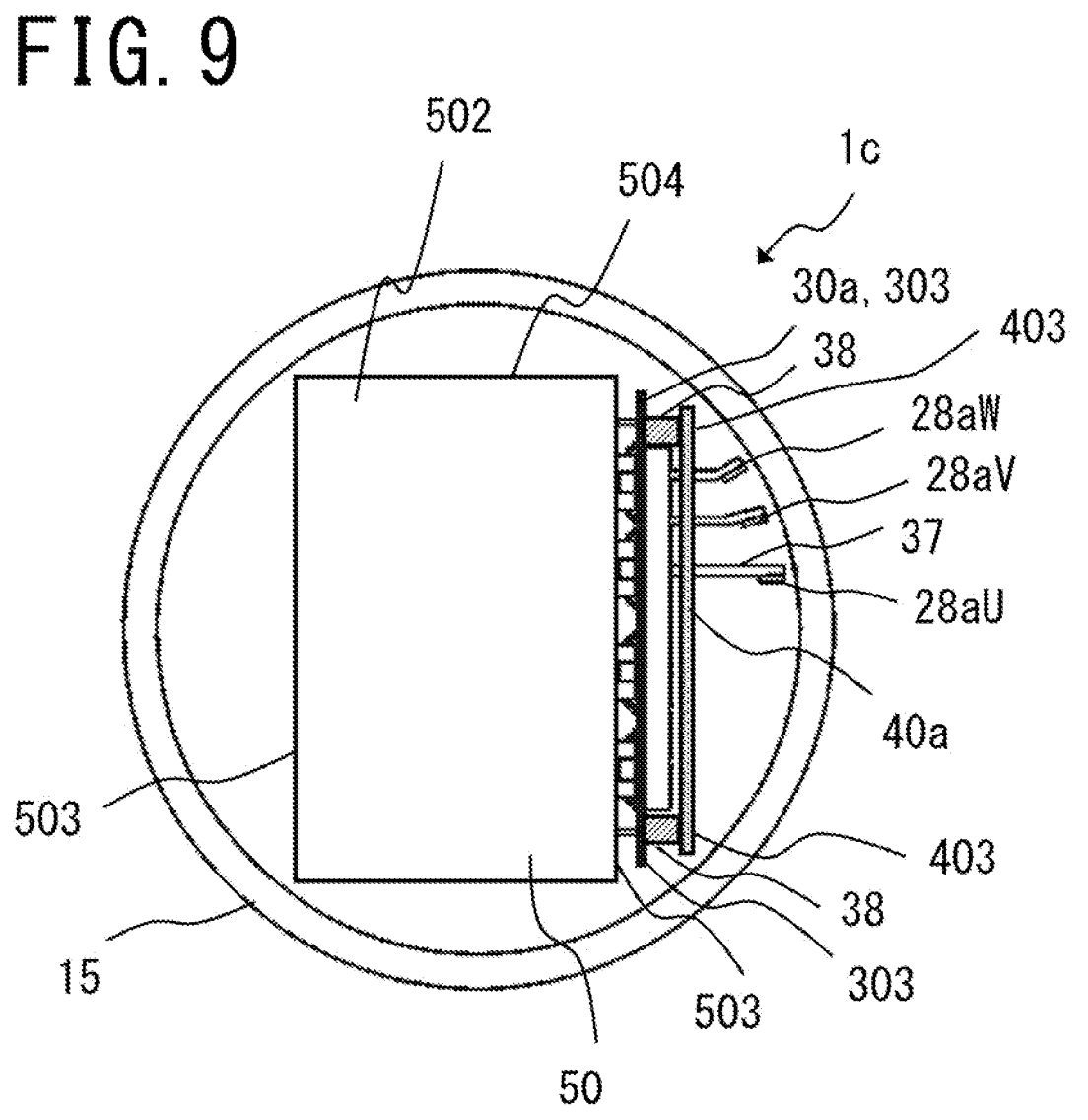

FIG. 8 is an axial-direction cross-sectional view of the electric rotating machine apparatus 100c according to Embodiment 4. FIG. 9 is a circumferential-direction cross-sectional view of a control unit 1c of the electric rotating machine apparatus 100c according to Embodiment 4. FIG. 9 is a drawing of the control unit 1c viewed from a sensor circuit board 60 after the control unit 1c is separated from the electric rotating machine 2 and the base portion 501 of the heat sink 50 is removed. The descriptions for the sensor circuit board 60 and the like are omitted.

The electric rotating machine apparatus 100c according to Embodiment 4 is different from Embodiment 1 only in the disposal of the control circuit board 40a of the control unit 1c. Specifically, the electric rotating machine apparatus 100c according to Embodiment 4 is different from Embodiment 1 in that the control circuit board 40a is disposed in a stacking manner at a side, of the plate-shaped portion 502 of the heat sink 50, that is the same as that of the current-supply circuit board 30a. The circuit diagram in FIG. 1 can be applied to the electric rotating machine apparatus 100c.

In Embodiment 4, the current-supply circuit board 30a and the control circuit board 40a are arranged at one of the long-side arrangement portions 503 of the plate-shaped portion 502 in the heat sink 50. As is the case with Embodiment 1, the interchanging of signals between the current-supply circuit board 30a and the control circuit board 40a is realized by use of the joint part 38. The respective signal terminals 381 of the joint part 38 are connected, through soldering or the like, with the connection hole provided in the longitudinal side 303 of the current-supply circuit board 30a and with the connection hole provided in the longitudinal side 403 of the control circuit board 40a.

The joint part 38 and the signal terminal 381 between the current-supply circuit board 30a and the control circuit board 40a are made shorter; thus, cost reduction and weight saving can be performed, and hence downsizing of the product, especially, radial-direction downsizing can be performed. In addition, in the control unit 1c according to Embodiment 4, the current-supply circuit board 30a and the control circuit board 40a are arranged at the one side of the plate-shaped portion 502 of the heat sink 50; thus, the heat capacity of the heat sink with respect to the current-supply circuit board 30a can be raised and hence the heat resistance can be enhanced.

Because the thermal loss and the heat-generation amount in the current-supply circuit board 30a are overwhelming, the current-supply circuit board 30a is adhered to the one side of the plate-shaped portion 502 of the heat sink 50, and hence priority can be given to cooling of the current-supply circuit board 30a. In addition, the circuit board mounting to the plate-shaped portion 502 of the heat sink 50 is made only at the one side thereof; therefore, the mounting cost can be reduced.

5. Embodiment 5

Figure 10:
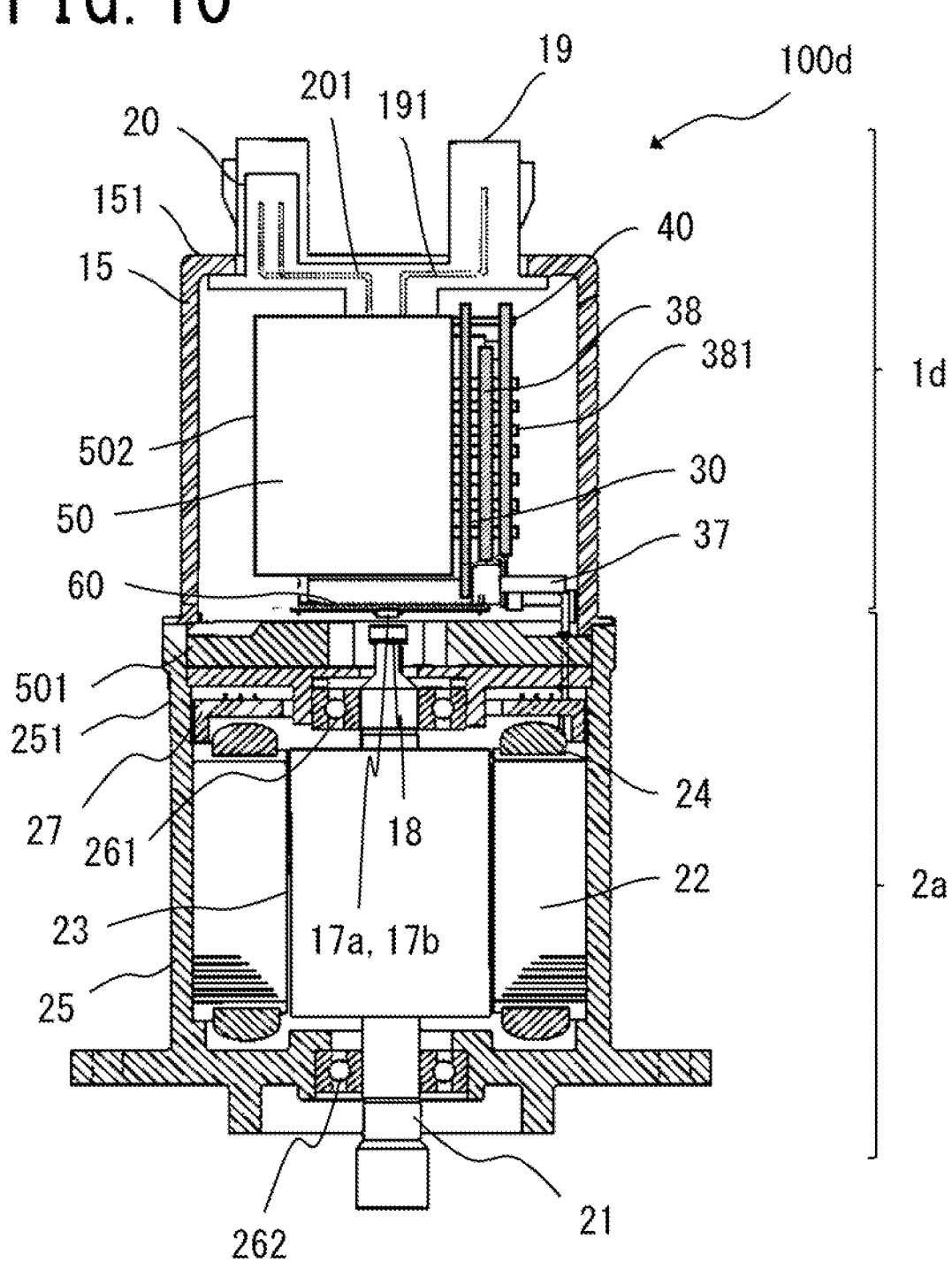
FIG. 10 is an axial-direction cross-sectional view of a rotating electric machine apparatus according to Embodiment 5.
Figure 11:
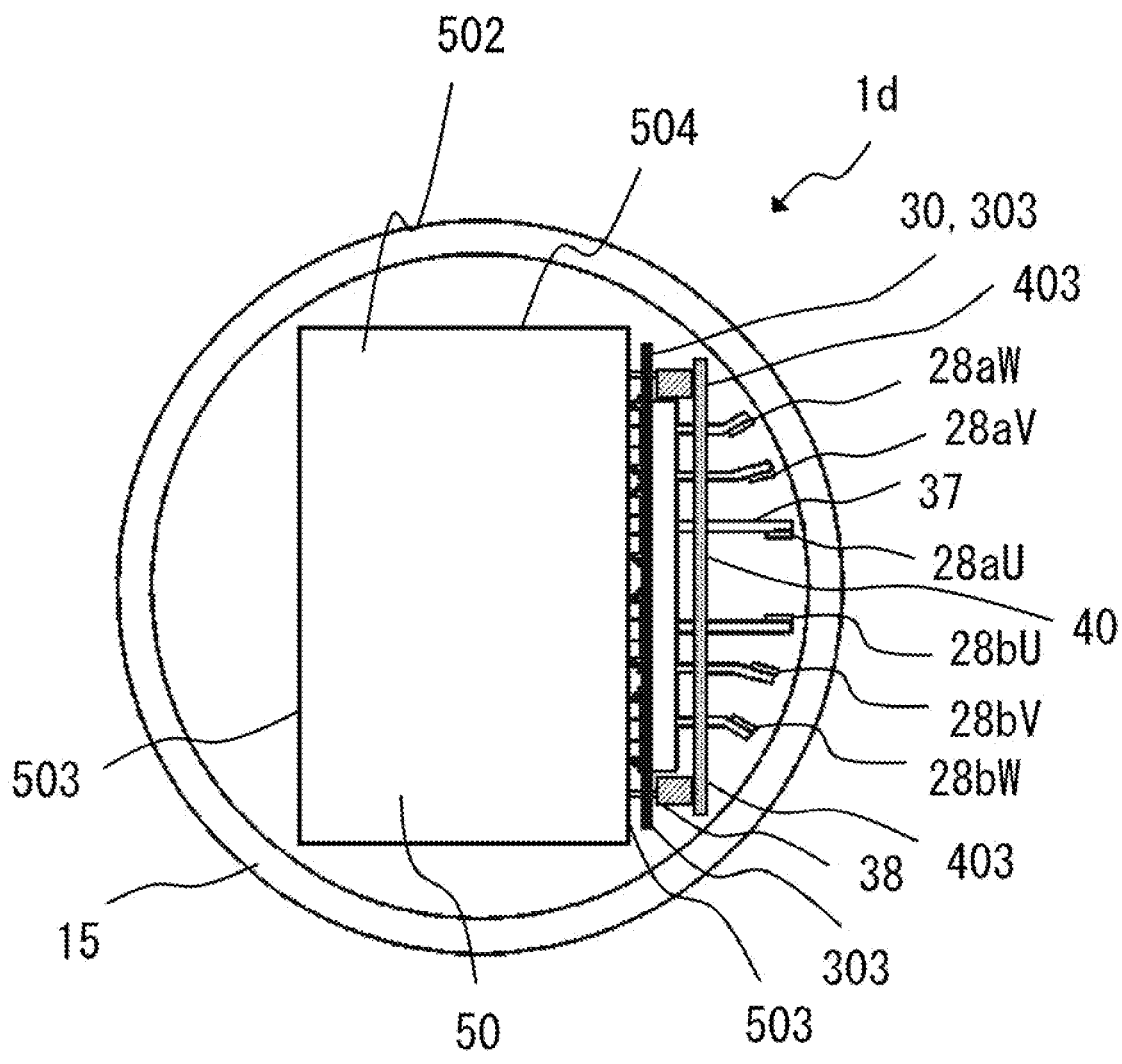
FIG. 11 is a circumferential-direction cross-sectional view of a control unit of the electric rotating machine apparatus according to Embodiment 5.

FIG. 10 is an axial-direction cross-sectional view of an electric rotating machine apparatus 100d according to Embodiment 5. FIG. 11 is a circumferential-direction cross-sectional view of a control unit 1d of the electric rotating machine apparatus 100d according to Embodiment 5. FIG. 11 is a drawing of the control unit 1d viewed from the sensor circuit board 60 after the control unit 1d is separated from the electric rotating machine 2a and the base portion 501 of the heat sink 50 is removed. The descriptions for the sensor circuit board 60 and the like are omitted. The electric rotating machine apparatus 100d according to Embodiment 5 is different from Embodiment 2 only in the disposal of the control circuit board 40 of the control unit 1d. Specifically, the electric rotating machine apparatus 100d according to Embodiment 5 is different from Embodiment 2 in that the control circuit board 40 is disposed in a side, of the plate-shaped portion 502 of the heat sink 50, that is the same as that of the current-supply circuit board 30. The circuit diagram in FIG. 4 can be applied to the electric rotating machine apparatus 100d.

In Embodiment 5, the current-supply circuit board 30 and the control circuit board 40 are arranged at one of the long-side arrangement portions 503 of the plate-shaped portion 502 in the heat sink 50. As is the case with Embodiment 2, the interchanging of signals between the current-supply circuit board 30 and the control circuit board 40 is realized by use of the joint part 38. The respective signal terminals 381 of the joint part 38 are connected, through soldering or the like, with the connection hole provided in the longitudinal side 303 of the current-supply circuit board 30 and with the connection hole provided in the longitudinal side 403 of the control circuit board 40.

The joint part 38 and the signal terminal 381 between the current-supply circuit board 30 and the control circuit board 40 are made shorter; thus, cost reduction and weight saving can be performed, and hence downsizing of the product, especially, radial-direction downsizing can be performed. In addition, in the control unit 1*d* according to Embodiment 5, the current-supply circuit board 30 and the control circuit board 40 are arranged at the one side of the plate-shaped portion 502 of the heat sink 50; thus, the heat capacity of the heat sink with respect to the current-supply circuit board 30 can be raised and hence the heat resistance can be enhanced.

Because the thermal loss and the heat-generation amount in the current-supply circuit board 30 are overwhelming, the current-supply circuit board 30 is adhered to the one side of the plate-shaped portion 502 of the heat sink 50, and hence priority can be given to cooling of the current-supply circuit board 30. In addition, the circuit board mounting to the plate-shaped portion 502 of the heat sink 50 is made only at the one side thereof; therefore, the mounting cost can be reduced.

6. Embodiment 6

Figure 12:
FIG. 12 is an axial-direction cross-sectional view of a rotating electric machine apparatus according to Embodiment 6.
Figure 13:
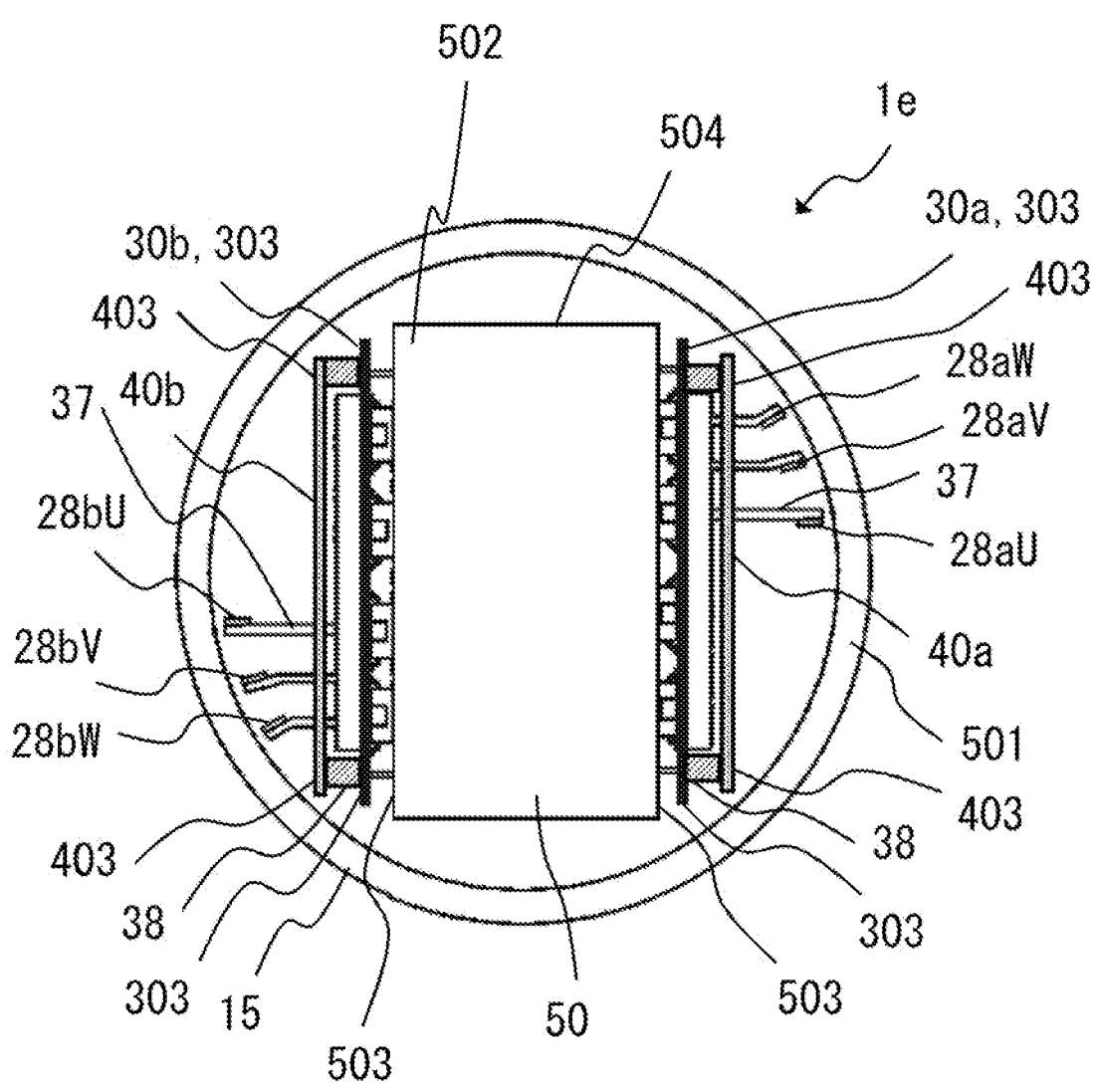
FIG. 13 is a circumferential-direction cross-sectional view of a control unit of the electric rotating machine apparatus according to Embodiment 6.

FIG. 12 is an axial-direction cross-sectional view of an electric rotating machine apparatus 100*e* according to Embodiment 6. FIG. 13 is a circumferential-direction cross-sectional view of a control unit 1*e* of the electric rotating machine apparatus 100*e* according to Embodiment 6. FIG. 13 is a drawing of the control unit 1*e* viewed from the sensor circuit board 60 after the control unit 1*e* is separated from the electric rotating machine 2*a* and the base portion 501 of the heat sink 50 is removed. The descriptions for the sensor circuit board 60 and the like are omitted.

The electric rotating machine apparatus 100*e* according to Embodiment 6 is different from Embodiment 3 only in the arrangement of the control circuit board 40*a* of the control unit 1*e*, the second control circuit board 40*b*, the current-supply circuit board 30*a*, and the second current-supply circuit board 30*b*.

Specifically, the electric rotating machine apparatus 100*e* according to Embodiment 6 is different from Embodiment 3 in that the current-supply circuit board 30*a* and the control circuit board 40*a* are arranged in a stacking manner at one side of the plate-shaped portion 502 of the heat sink 50 in such a way as to be spaced apart from and in parallel with each other and in that the second current-supply circuit board 30*b* and the second control circuit board 40*b* are arranged in a stacking manner at the other side of the plate-shaped portion 502 of the heat sink 50 in such a way as to be spaced apart from and in parallel with each other. The circuit diagram in FIG. 4 can be applied to the electric rotating machine apparatus 100*e*.

A joint part 38*a* and the signal terminal 381 between the current-supply circuit board 30*a* and the control circuit board 40*a* are made shorter. In addition, a joint part 38*b* and the signal terminal 381 between the second current-supply circuit board 30*b* and the second control circuit board 40*b* are made shorter. Accordingly, cost reduction and weight saving can be performed, and hence downsizing of the product, especially, radial-direction downsizing can be performed. In addition, in the control unit 1*e* according to Embodiment 6, the current-supply circuit board 30*a* and the second current-supply circuit board 30*b* are arranged at the both respective sides of the plate-shaped portion 502 of the heat sink 50; thus, the heat capacity of the heat sink with respect to each of the current-supply circuit board 30*a* and the second current-supply circuit board 30*b* can be raised and hence the heat resistance can be enhanced. Because the heat-generation amount in each of the control circuit board 40*a* and the second control circuit board 40*b* is small in comparison with the heat-generation amount in each of the current-supply circuit board 30*a* and the second current-supply circuit board 30*b*, no big problem is posed even when each of the control circuit board 40*a* and the second control circuit board 40*b* is apart from the heat sink.

Moreover, because each one of the combination of the current-supply circuit board 30*a* and the control circuit board 40*a* and the combination of the second current-supply circuit board 30*b* and the second control circuit board 40*b* is arranged at corresponding one of the front side and the back side of the plate-shaped portion 502 of the heat sink 50, one of the combinations survives even when external force is exerted on the combinations, and hence the possibility that degenerated driving can be performed becomes high.

7. Embodiment 7

Figure 14:
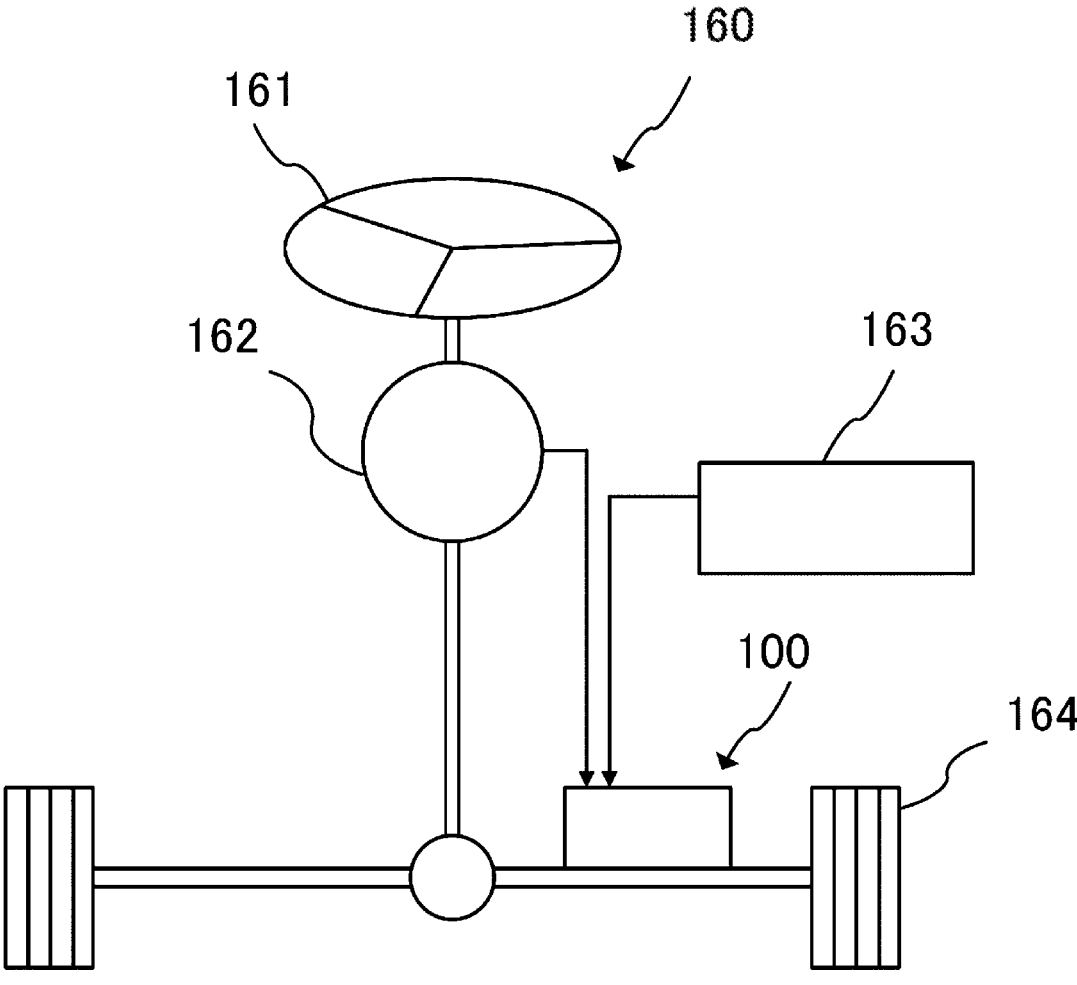
FIG. 14 is a configuration diagram of an electric power steering apparatus according to Embodiment 7.

FIG. 14 is a configuration diagram of an electric power steering apparatus 160 according to Embodiment 7. By use of FIG. 14, there will be explained an example in which the electric rotating machine apparatus 100 is applied to the electric power steering apparatus 160 to be mounted in a vehicle. FIG. 14 is an overall configuration diagram of the electric power steering apparatus 160 and illustrates an example of a rack-type electric power steering apparatus.

When a driver makes the steering mechanism of a vehicle generate steering torque by means of a steering wheel 161, a torque sensor 162 detects the steering torque and then outputs it to the electric rotating machine apparatus 100. In addition, a speed sensor 163 detects the traveling speed of the vehicle and then outputs it to the electric rotating machine apparatus 100. Based on the inputs from the torque sensor 162 and the speed sensor 163, the electric rotating machine apparatus 100 generates auxiliary torque for supplementing the steering torque and then supplies it to the steering mechanism of front wheels 164 of the vehicle.

The torque sensor 162 and the speed sensor 163 are included in the sensor group 8 in FIG. 1. It may be allowed that the electric rotating machine apparatus 100 generates auxiliary torque based on inputs other than the inputs from the torque sensor 162 and the speed sensor 163. The heat-radiation property of the electric rotating machine apparatus 100 to be applied to an electric power steering apparatus is secured, the product size is suppressed from being enlarged, and the effect of noise generated in a current-supply circuit can be suppressed; thus, the performance is raised and the mountability for a vehicle is enhanced. Although the electric rotating machine apparatus 100 has been explained in FIG. 14, the above explanation can be applied also to each of the electric rotating machine apparatuses 100*a*, 100*b*, 100*c*, 100*d*, and 100*e*.

Although the present disclosure is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

The invention claimed is:

1. An electric rotating machine apparatus comprising:
an electric rotating machine;
a heat sink that is disposed at axial-direction one side of the electric rotating machine and has a plate-shaped portion extending toward the axial-direction one side;
a current-supply circuit board that is disposed on one surface of a plate-shaped portion of the heat sink and on which a current-supply circuit for supplying an electric current to the electric rotating machine is mounted;
a control circuit board that is disposed in such a way as to be spaced apart from and in parallel with the current-supply circuit board and on which a control circuit for controlling the current-supply circuit is mounted; and
a sensor circuit board that faces an axle end at the axial-direction one side of the electric rotating machine and on which a rotation sensor for detecting a rotation state of the electric rotating machine is mounted,
wherein the sensor circuit board has a signal terminal for connecting the current-supply circuit board with the control circuit board and electrically connects the current-supply circuit board with the control circuit board.

2. The electric rotating machine apparatus according to claim 1, wherein the control circuit board is disposed on the other surface of the plate-shaped portion of the heat sink.

3. The electric rotating machine apparatus according to claim 1, wherein the control circuit board and the current-supply circuit board are arranged in a stacking manner at the one surface side of the plate-shaped portion of the heat sink in such a way as to spaced apart from each other.

4. The electric rotating machine apparatus according to claim 1,
wherein a pair of current-supply circuits are mounted on the current-supply circuit board, and
wherein a pair of control circuits are mounted on the control circuit board.

5. The electric rotating machine apparatus according to claim 1,
wherein a pair of the current-supply circuit boards are arranged in a row, and
wherein a pair of the control circuit boards are arranged in a row.

6. The electric rotating machine apparatus according to claim 1, further comprising:
a second current-supply circuit board that is disposed on the other surface of the plate-shaped portion of the heat sink and on which a second current-supply circuit for supplying an electric current to the electric rotating machine is mounted; and
a second control circuit board that is disposed at the other surface side of the plate-shaped portion of the heat sink in such a way as to be spaced apart from and in parallel with the second current-supply circuit board in a stacking manner and on which a second control circuit for controlling the second current-supply circuit is mounted,
wherein the control circuit board and the current-supply circuit board are arranged at the one surface side of the plate-shaped portion of the heat sink in such a way as to be spaced apart from each other in a stacking manner.

7. The electric rotating machine apparatus according to claim 1, wherein a cross section of the plate-shaped portion of the heat sink is in the shape of a rectangle, one surface of the plate-shaped portion corresponds to one long side of the rectangle of the cross section, and the other surface of the plate-shaped portion corresponds to the other long side of the rectangle of the cross section.

8. The electric rotating machine apparatus according to claim 1, further comprising a joint part in which two or more signal terminals are lined up in the axial direction of the electric rotating machine, wherein said two or more signal terminals connect the current-supply circuit board with the control circuit board in such a way as to extend therebetween perpendicularly to the axial direction of the electric rotating machine.

9. The electric rotating machine apparatus according to claim 1, further comprising a current-supply terminal that extends from the current-supply circuit board toward a radially outside of the electric rotating machine and is connected with a winding of the electric rotating machine.

10. An electric power steering apparatus having the electric rotating machine apparatus according to claim 1.

11. The electric rotating machine apparatus according to claim 1, wherein the rotation sensor is connected with the control circuit and is insulated from the current-supply circuit.

12. The electric rotating machine apparatus according to claim 1, comprising:
a first current-supply circuit that is arranged at one side of a center line, of a current-supply circuit board disposed on one surface of the plate-shaped portion of the heat sink, that is parallel to a rotation axle, the first current-supply circuit supplying an electric current to the electric rotating machine;
a second current-supply circuit that is arranged at the other side of the center line of the current-supply circuit board and supplies an electric current to the electric rotating machine;
a first control circuit that is arranged at the one side of a center line, of a control circuit board disposed on the other surface of the plate-shaped portion of the heat sink, that is parallel to the rotation axle, the first control circuit controlling the first current-supply circuit;
a second control circuit that is arranged at the other side of the center line of the control circuit board and controls the second current-supply circuit;
a first control terminal for connecting an end at the one side of the control circuit board with an end at the one side of the current-supply circuit board; and
a second control terminal for connecting an end at the other side of the control circuit board with an end at the other side of the current-supply circuit board.

13. The electric rotating machine apparatus according to claim 1, comprising:
a first current-supply circuit board that is arranged at one side of a center line, of one surface of the plate-shaped portion of the heat sink, that is parallel to a rotation axle, and on which a first current-supply circuit that supplies an electric current to the electric rotating machine is mounted;

a second current-supply circuit board that is arranged at the other side of the center line, of the one surface of the plate-shaped portion of the heat sink, that is parallel to the rotation axle, and on which a second current-supply circuit that supplies an electric current to the electric rotating machine is mounted;

a first control circuit board that is arranged at the one side of the center line, of the other surface of the plate-shaped portion of the heat sink, that is parallel to the rotation axle, and on which a first control circuit that controls the first current-supply circuit is mounted;

a second control circuit board that is arranged at the other side of the center line, of the other surface of the plate-shaped portion of the heat sink, that is parallel to the rotation axle, and on which a second control circuit that controls the second current-supply circuit is mounted;

a first control terminal for connecting an end at the one side of the first control circuit board with an end at the one side of the first current-supply circuit board; and a second control terminal for connecting an end at the other side of the second control circuit board with an end at the other side of the second current-supply circuit board.

\* \* \* \* \*